(12) United States Patent
Nakamura et al.

(10) Patent No.: US 8,160,778 B2
(45) Date of Patent: Apr. 17, 2012

(54) STEERING SYSTEM FOR ENGINEERING VEHICLE

(75) Inventors: Kazunori Nakamura, Tsuchiura (JP);
Tsuyoshi Nakamura, Tsuchiura (JP);
Mitsuo Kihara, Kasumigaura (JP);
Hiroyuki Azuma, Ushiku (JP); Atsushi Shimazu, Moriya (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 328 days.

(21) Appl. No.: 12/377,393

(22) PCT Filed: Dec. 26, 2007

(86) PCT No.: PCT/JP2007/075033
§ 371 (c)(1),
(2), (4) Date: Feb. 13, 2009

(87) PCT Pub. No.: WO2008/081843
PCT Pub. Date: Jul. 10, 2008

(65) Prior Publication Data
US 2010/0228439 A1    Sep. 9, 2010

(30) Foreign Application Priority Data

Dec. 26, 2006 (JP) .................. 2006-350432
Dec. 26, 2006 (JP) .................. 2006-350453

(51) Int. Cl.
B62D 5/28    (2006.01)
(52) U.S. Cl. ........................ 701/42; 180/422

(58) Field of Classification Search .......... 701/41, 701/42; 180/421, 422
See application file for complete search history.

(56) References Cited

U.S. PATENT DOCUMENTS

| 4,663,936 | A | * | 5/1987 | Morgan ................. 60/422 |
| 4,995,472 | A | * | 2/1991 | Hayashi et al. .......... 180/234 |
| 5,996,701 | A | | 12/1999 | Fukasawa et al. |
| 6,176,083 | B1 | | 1/2001 | Ikari |
| 2005/0126165 | A1 | | 6/2005 | Honda et al. |
| 2006/0219466 | A1 | | 10/2006 | Khalil et al. |

FOREIGN PATENT DOCUMENTS

| JP | 62-55664 | 4/1987 |
| JP | 1-154974 | 10/1989 |
| JP | 10-045014 | 2/1998 |
| JP | 10-945914 | 2/1998 |
| JP | 11181823 A * | 7/1999 |

(Continued)

*Primary Examiner* — Kevin Hurley
(74) *Attorney, Agent, or Firm* — Mattingly & Malur, PC

(57) ABSTRACT

A hydraulic steering unit 5 generates a control pressure corresponding to the rotational quantity and rotational direction of the steering wheel 109 on the basis of pressurized oil of a pilot pump 13. Signals of pressure sensors 6a and 6b used to detect the control pressure, and a signal of a front operation detection unit 31, are inputted into a controller 132. A controller 32 and solenoid valves 33a and 33b control a stroke of a steering valve 4 so that the stroke becomes larger with increase in control pressure detected by each of the pressure sensors 6a and 6b. In addition, when the operation of a front work device is detected, the controller 32 and the solenoid valves 33a and 33b control the stroke of the steering valve 4 so that the stroke becomes larger than that provided when the operation of the front work device is not detected.

10 Claims, 8 Drawing Sheets

FOREIGN PATENT DOCUMENTS

| | | |
|---|---|---|
| JP | 2001-030923 | 2/2001 |
| JP | 2003-184134 | 7/2003 |
| JP | 2005-205924 | 8/2005 |
| JP | 2005-297924 | 10/2005 |
| WO | 99/54557 | 10/1999 |
| WO | 99/55573 | 11/1999 |

* cited by examiner

STEERING SYSTEM FOR ENGINEERING VEHICLE

TECHNICAL FIELD

The present invention relates to a steering system of an engineering vehicle such as a wheel loader.

BACKGROUND ART

The steering system for an engineering vehicle such as a wheel loader includes: a hydraulic pump; a steering cylinder driven by pressurized oil discharged from the hydraulic pump; and a steering valve for controlling the direction and flow rate of the pressurized oil supplied from the hydraulic pump to the steering cylinder. The steering system switches the steering valve based on the rotational direction and rotational quantity of the steering wheel so as to control the steering cylinder. In this case, the switching of the steering valve based on the rotational direction and rotational quantity of the steering wheel is performed by use of a hydraulic steering unit called "Orbit roll" (trade name). Here, the hydraulic steering unit includes: a hydraulic valve that operates in synchronization with the rotational operation of the steering wheel; and a hydraulic motor. The hydraulic steering unit is configured to generate a hydraulic pressure whose flow rate corresponds to the rotational quantity and rotational direction of the steering wheel.

In such a steering system for an engineering vehicle, typically, the hydraulic steering unit is located in a main circuit, and the steering valve is operated with the steering wheel to control the steering cylinder. In this case, a hydraulic valve of the hydraulic steering unit is provided as a steering valve, and the hydraulic pressure generated by the hydraulic valve unit is directly introduced into the steering cylinder.

In contrast to such a typical steering system for an engineering vehicle, a technology is known in which the hydraulic steering unit is used as an operation system of the steering valve so that the rotational operation of the steering wheel can be performed with a small force (for example, patent document 1, JP-U-1-154974). This kind of steering system uses a pilot pump as a hydraulic pressure source to introduce the oil pressure generated by a hydraulic steering unit into an oil-pressure switching unit (pressure receiving unit) of a steering valve so that the steering valve is switched. The steering valve is provided with a throttle line for converting the hydraulic pressure introduced from the hydraulic steering unit into the control pressure used for switching the steering valve.

On the other hand, there is also known a technology in which the operation system of the steering valve is formed by an electric/hydraulic steering unit including a controller and a solenoid valve so that the steering valve is electrically/hydraulically switched (for example, patent document 2, JP-A-10-45014). According to this technology, a rotational operation angle (steering angle) of the steering wheel is detected by a potentiometer, and the detected value is inputted into a controller. The controller outputs to the solenoid valve a command signal (electric signal) corresponding to the detection value. The solenoid valve, in turn, outputs a control pressure corresponding to the command signal. The control pressure is introduced into a hydraulic switching unit (pressure receiving unit) of the steering valve so that the steering valve is switched.

In addition, in the case of the steering system described in the patent document 2, a controller is provided with two or more kinds of predetermined gains (instruction signal/steering angle) of an instruction signal for a steering angle detection value. An operator is allowed to select one of the gains by operating a switch. This makes it possible to adjust the steering speed of wheels (the driving speed of a steering cylinder) with respect to the rotational operation of the steering wheel so that the steering speed matches both traveling and actual work. Therefore, the optimum steering operability can be achieved both during traveling and during actual work. In addition, there is also proposed a modified example in which a speed sensor for detecting the traveling speed is provided, and in which an instruction signal is consecutively changed in response to the traveling speed.

Patent document 1: JP-U-1-154974
Patent document 2: JP-A-10-45014

DISCLOSURE OF INVENTION

Problems to be Solved by the Invention

The work to be performed with an engineering vehicle such as a wheel loader includes the work in which a front work device is operated with the engineering vehicle kept in a traveling state. An example of the work is excavating natural ground with a wheel loader. In the excavating, a car body is moved forward to push a bucket onto the natural ground so that the natural ground is excavated. After the excavating, the car body is moved backward with the bucket (containing earth and sand) lifted up, and a direction of the car body is then changed. After that, the car body is moved by the operation of traveling only, and the earth and sand are discharged into a truck, or the like.

Incidentally, because this work is simultaneous operation of both the traveling and the operation of the front work device, if the steering speed of the wheels is low with respect to the rotational operation of the steering wheel, an operator is obliged to pay careful attention to the steering operation, which causes fatigue. Therefore, in this case, it is desirable that the steering speed of the wheels be high with respect to the rotational operation of the steering wheel. As a result, the operator's fatigue is reduced, which leads to an improvement in work efficiency. On the other hand, in the case of traveling only, the higher security is achieved by setting the steering speed of the wheels at a value that is not high with respect to the rotational operation of the steering wheel.

Because the steering system of the engineering vehicle described in the patent document 1 cannot change a change ratio of the steering speed of wheels to the rotational operation of the steering wheel, the optimum wheel steering speed cannot be acquired in the simultaneous operation of both the traveling and the operation of the front work device, and in the operation of traveling only.

Because the steering system of the engineering vehicle described in the patent document 2 can change the predetermined gains (instruction signal/steering angle) of the instruction signal for the steering angle detection value by operating the switch, the optimum wheel steering speed can be acquired in the simultaneous operation of both the traveling and the operation of the front work device, and in the operation of traveling only. However, when the work is switched from the simultaneous operation of both the traveling and the operation of the front work device (for example, excavating) to the operation of traveling only (for example, moving to a place where the earth and sand are discharged), or when the work is switched from the operation of traveling only to the simultaneous operation of both the traveling and the operation of the front work device, the operator is required to change the gain each time by operating the switch, which is very troublesome.

An object of the present invention is to provide a steering system for an engineering vehicle, which is capable of keeping the wheel steering speed at an optimum value with respect to the rotational operation of the steering wheel in the simultaneous operation of both the traveling and the operation of the front work device, and in the operation of traveling only, and which is thereby capable of ensuring not only the work efficiency and security but also the high operability.

Means for Solving the Problems (1) In order to achieve the above object, according to one aspect of the present invention, there is provided a steering system for an engineering vehicle comprising: a hydraulic pump; a steering cylinder driven by pressurized oil discharged from the hydraulic pump; a steering valve for controlling the direction and flow rate of the pressurized oil supplied from the hydraulic pump to the steering cylinder; and a steering wheel manipulated by an operator, the steering system switching the steering valve based on the rotational operation of the steering wheel so as to control the steering cylinder. The steering system further includes: front operation detection means for detecting an operational state of a front work device disposed on a vehicle front part of the engineering vehicle; and steering operation control means for controlling the switching direction and flow rate of the steering valve on the basis of the rotational operation of the steering wheel and the operational state of the front work device detected by the front operation detection means.

According to the present invention configured in this manner, the front operation detection means and the steering operation control means are provided. The switching direction and flow rate of the steering valve are controlled on the basis of the rotational operation of the steering wheel, and on the basis of the operational state of the front work device detected by the front operation detection means. As a result, during the simultaneous operation of both the traveling and the operation of the front work device, when steering operation is performed with the front work device operated, the flow rate of the steering valve can be so controlled that the flow rate becomes higher than that provided when the operation of the front work device is not detected. Therefore, the wheel steering speed with respect to the rotational operation of the steering wheel increases, which enable the operator to easily manipulate the steering wheel at the time of the simultaneous operation of both the traveling and the operation of the front work device. As a result, the operator's fatigue is reduced, which leads to an improvement in work efficiency.

On the other hand, when the operation of the front work device is not detected, the flow rate of the steering valve is so controlled that the flow rate becomes lower than that provided when the operation of the front work device has been detected. Therefore, when the steering operation is performed during the operation of traveling only, the wheel steering speed with respect to the rotational operation of the steering wheel decreases. As a result, the security is improved.

In addition, when the front work device is manipulated, the wheel steering speed is automatically changed. This eliminates the need for the operator's operation, and accordingly, the high operability can be achieved.

Thus, according to the present invention, the wheel steering speed can be kept at an optimum value with respect to the rotational operation of the steering wheel in the simultaneous operation of both the traveling and the operation of the front work device, and in the operation of traveling only. This makes it possible to ensure not only the work efficiency and security but also the high operability.

(2) In the above-described item (1), preferably, the steering operation control means includes: a hydraulic steering unit to which the steering wheel is coupled, the hydraulic steering unit operating by the rotation operation of the steering wheel so as to generate first and second control pressures corresponding to the rotational quantity and rotational direction of the steering wheel on the basis of pressurized oil of a pilot hydraulic fluid source; first and second pressure sensors for detecting the first and second control pressures generated by the hydraulic steering unit respectively; and control means for controlling a stroke of the steering valve on the basis of the first and second control pressures that has been detected by the first and second pressure sensors respectively, and on the basis of the operational state of the front work device detected by the front operation detection means.

As a result, a stroke of the steering valve is controlled in response to the rotational operation of the steering wheel and the operational state of the front work device so that the flow rate of the steering valve is controlled. Accordingly, as described above, the wheel steering speed is kept at an optimum value with respect to the rotational operation of the steering wheel in the simultaneous operation of both the traveling and the operation of the front work device, and in the operation of traveling only. Therefore, the work efficiency and security can be ensured, and the high operability can also be achieved.

In addition, the rotational operation of the steering wheel causes the hydraulic steering unit to operate so that the steering valve is switched on the basis of the first and second control pressures generated by the hydraulic steering unit. Therefore, the rotational operation of the steering wheel can be performed with weaker force.

(3) In the above-described item (2), for example, the control means controls the stroke of the steering valve so that the stroke becomes larger with increase in the first and second control pressures that have been detected by the first and second pressure sensors respectively. In addition to it, when the operation of the front work device is detected by the front operation detection means, the control means controls the stroke of the steering valve so that the stroke becomes larger than that provided when the operation of the front work device is not detected.

As a result, as described above, in the simultaneous operation of both the traveling and the operation of the front work device, and in the operation of traveling only, the wheel steering speed is kept at an optimum value with respect to the rotational operation of the steering wheel. Therefore, the work efficiency and security can be ensured.

(4) In the above-described item (2), the control means may control the stroke of the steering valve so that the stroke becomes larger with increase in the first and second control pressures that have been detected by the first and second pressure sensors respectively. In addition to it, when the operation in which the movement of the front work device is relatively large is detected by the front operation detection means, the control means may control the stroke of the steering valve so that the stroke becomes larger than that provided when the operation in which the movement of the front work device is relatively large is not detected.

Therefore, even in the case of the simultaneous operation of both the traveling and the operation of the front work device, when an operator performs slight-move operational work requiring carefulness, in which the movement of the front work device is relatively small, the stroke of the steering valve is so controlled that the stroke becomes smaller. This enables the operator to precisely and correctly perform the slight-move operational work. In addition, the operator can prevent the load from dropping from the front work device, and can prevent the behavior of the car body from being disordered. In contrast, in the case of usual operational work in which the movement of the front work device is relatively large, the stroke of the steering valve is so controlled that the stroke becomes larger. This enables the operator to easily manipulate the steering wheel during the simultaneous operation of both the traveling and the operation of the front work device. Accordingly, the operator's fatigue is reduced, which leads to an improvement in work efficiency.

(5) In the above-described items (2) through (4), preferably, the steering valve includes: a spool used as a valve; and first and second pressure receiving units that are disposed at both ends of the spool, the driving pressure being introduced into each of the first and second pressure receiving units so that the spool is driven on the basis of the driving pressure to change the stroke. In addition, the control means includes: first and second solenoid valves that are provided corresponding to the first and second pressure receiving units respectively, and that operate with a control current to output a driving pressure corresponding to the control current; and a controller that inputs detection values of the first and second pressure sensors and a detection value of the front operation detection means to perform specified arithmetic operation on the basis of the detection values, and that then outputs the control current to the first and second solenoid valves.

This enables the control means to control the stroke of the steering valve on the basis of the first and second control pressures generated by the hydraulic steering unit, and on the basis of the operational state of the front work device detected by the front operation detection means.

(6) Moreover, in the above-described item (5), preferably, the controller includes: first calculation means for calculating a first target driving pressure that increases with increase in control pressure detected by the first pressure sensor; second calculation means for calculating a second target driving pressure that increases with increase in control pressure detected by the second pressure sensor; and third calculation means for modifying the first and second target driving pressures so that when the operation of the front work device is detected by the front operation detection means, values of the first and second target driving pressures become larger than those provided when the operation of the front work device is not detected. In this case, the control current is output to the first and second solenoid valves so that the first and second target driving pressures modified by the third calculation means are achieved.

This enables the control means to control the stroke of the steering valve so that the stroke becomes larger with increase in the first and second control pressures that have been detected by the first and second pressure sensors respectively. In addition to it, when the operation of the front work device is detected by the front operation detection means, the control means can control the stroke of the steering valve so that the stroke becomes larger than that provided when the operation of the front work device is not detected.

(7) Moreover, in the above-described item (1), preferably, said steering system further includes a priority valve that is located between the hydraulic pump and the steering valve, and that includes setting means for setting a target value of the differential pressure across the steering valve, said priority valve supplying by priority the steering cylinder with the pressurized oil discharged from the hydraulic pump and supplying an operational hydraulic circuit for driving a work device with a surplus flow of the pressurized oil, by controlling the differential pressure across the steering valve so that the differential pressure is kept at the target value. The steering operation control means includes: a hydraulic steering unit to which the steering wheel is coupled, the hydraulic steering unit operating by the rotational operation of the steering wheel so as to generate a control pressure corresponding to the rotational quantity and rotational direction of the steering wheel on the basis of pressurized oil of a pilot hydraulic fluid source; and a pilot hydraulic line for introducing the control pressure generated by the hydraulic steering unit into the pressure receiving unit of the steering valve to switch the steering valve; and control means for changing a target value of the differential pressure across the steering valve on the basis of the operational state of the front work device detected by the front operation detection means, the target value being set by the setting means of the priority valve.

Thus, changing of the target value of the differential pressure across the steering valve, which is set by the setting means of the priority valve, also causes the differential pressure across the steering valve to change in response to the operational state of the front work device. Consequently, the flow rate of the steering valve is controlled. Therefore, as described above, the wheel steering speed can be kept at an optimum value with respect to the rotational operation of the steering wheel in the simultaneous operation of both the traveling and the operation of the front work device, and in the operation of traveling only. This makes it possible to ensure not only the work efficiency and security but also the high operability.

In addition, switching operation of the steering valve in response to the rotational operation of the steering wheel is hydraulically performed by the hydraulic steering unit; and a flow rate of the steering valve in response to the operational state of the front work device is controlled by the control of the differential pressure across the steering valve using the priority valve. Therefore, even in the case where a failure occurs in the control means that is the only one electrical system, the steering operation of an operating vehicle can be performed by the hydraulic steering unit. This makes it possible to ensure the high level of security.

Moreover, the switching operation of the steering valve in response to the rotational operation of the steering wheel is performed by introducing the control pressure generated by the hydraulic steering unit into the operation unit of the steering valve. Therefore, the rotational operation of the steering wheel can be performed with weaker force.

(8) In the above-described item (7), for example, when the operation of the front work device is detected by the front operation detection means, the control means changes the target value set by the settings means of the priority valve so that the target value becomes larger than that provided when the operation of the front work device is not detected.

As a result, as described above, in the simultaneous operation of both the traveling and the operation of the front work device, and in the operation of traveling only, the wheel steering speed is kept at an optimum value with respect to the rotational operation of the steering wheel. Therefore, the work efficiency and security can be ensured.

(9) In the above-described item (7), when the operation in which the movement of the front work device is relatively large is detected by the front operation detection means, the control means may change the target value set by the settings means of the priority valve so that the target value becomes larger than that provided when the operation in which the movement of the front work device is relatively large is not detected.

Therefore, even in the case of the simultaneous operation of both the traveling and the operation of the front work device, when an operator performs the slight-move operational work requiring carefulness, in which the movement of the front work device is relatively small, the differential pressure across the steering valve is so controlled that the differential pressure becomes lower. This enables the operator to precisely and correctly perform the slight-move operational work. In addition, the operator can prevent the load from dropping from the front work device, and can prevent the behavior of the car body from being disordered. In contrast, in the case of usual operational work in which the movement of the front work device is relatively large, the differential pressure across the steering valve is so controlled that the differential pressure becomes higher. This enables the operator to easily manipulate the steering wheel during the simultaneous operation of both the traveling and the operation of the front work device. Accordingly, the operator's fatigue is reduced, which leads to an improvement in work efficiency.

(10) Furthermore, in the above-described item (7), preferably, the control means includes: a solenoid valve that operates with a control current, and that outputs a control pressure corresponding to the control current; a pressure receiving unit that is provided for the priority valve, the pressure receiving unit changing based on the control pressure the target value set by the setting means; and a controller that inputs a detection value of the front operation detection means to calculate a value corresponding to the operational state of the front work device on the basis of the detection value, and that then outputs a control current to the solenoid valve so that the target value set by the settings means is changed to the calculated value.

This enables the control means to change the target value of the differential pressure across the steering valve on the basis of the detection value of the front operation detection means, the target value being set by the setting means of the priority valve.

Effects of the Invention

According to the present invention, the wheel steering speed can be kept at an optimum value with respect to the rotational operation of the steering wheel in the simultaneous operation of both the traveling and the operation of the front work device, and in the operation of traveling only. This makes it possible to ensure not only the work efficiency and security but also the high operability.

Moreover, according to the present invention, the rotational operation of the steering wheel can be performed with weaker force, and accordingly, the high operability can be achieved.

Furthermore, according to the present invention, even in the case where a failure occurs in an electrical system, the steering operation of the operating vehicle can be reliably performed. This makes it possible to ensure a high level of security.

DESCRIPTION OF REFERENCE NUMBERS

Figure 1:
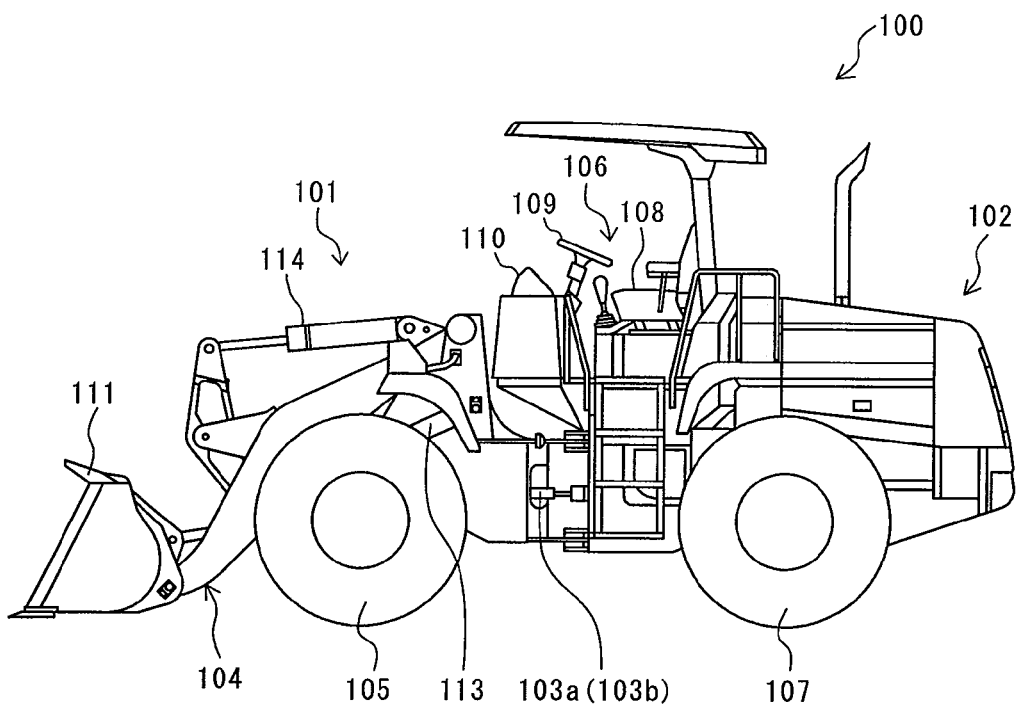
FIG. 1 is a diagram illustrating the appearance of a wheel loader as an example of an engineering vehicle to which the present invention is applied.

1 Engine
2 Hydraulic pump
2a Variable displacement control unit
4 Steering valve
5 Steering unit
6a, 6b Pressure sensor
7, 7A Priority valve
7a Inlet port
7b First outlet port
7c Second outlet port
11 Metering valve
12 Gerotor
17a, 17b Hydraulic line
18a, 18b Restrictor
24a, 24b Pressure receiving unit
24c Pressure receiving unit
25 Spring
26a, 26b Actuator hydraulic line
31 Front operation detection unit
32 Controller
32a First basic driving pressure operation unit
32b Second basic driving pressure operation unit
32c, 32Ac Modification coefficient operation unit
32d First target driving pressure operation unit
32e Second target driving pressure operation unit
32f First control current operation unit
32g Second control current operation unit
33a, 33b Solenoid valve
45, 46, 47 Shuttle valve
48 Pressure sensor
100 Wheel loader
101 Vehicle front part
102 Vehicle rear part
103a, 103b Steering cylinder
104 Front work device
106 Cabin
107 Rear wheel
108 Driver's seat
109 Steering wheel
110 Control lever unit
111 Bucket
112 Lift arm
113 Bucket cylinder
114 Arm cylinder
121 Operational hydraulic circuit
131a, 131b Pilot hydraulic line
132 Controller
132a Priority valve set pressure operation unit
132b Solenoid-valve output pressure operation unit
132c Control current operation unit

BEST MODES FOR CARRYING OUT THE INVENTION

Embodiments of the present invention will be described below with reference to the accompanying drawings.

FIG. 1 is a diagram illustrating the appearance of a wheel loader as an example of an engineering vehicle to which the present invention is applied.

In FIG. 1, reference numeral 100 denotes a wheel loader. The wheel loader 100 includes the vehicle front part 101 and the vehicle rear part 102. The vehicle front part 101 is pivotally connected to the vehicle rear part 102 such that the direction of the front part 101 can be changed with respect to the vehicle rear part 102 by a pair of steering cylinders 103a and 103b (refer to FIG. 2). The vehicle front part 101 is equipped with a front work device 104 and front wheels 105. On the other hand, the vehicle rear part 102 is equipped with a cabin 106 and rear wheels 107. The cabin 106 is provided with operational means including a driver's seat 108, a steering wheel 109, a control lever unit 110, an accelerator pedal (not illustrated), and an inching pedal (not illustrated). The front work device 104 includes a bucket 111 and a lift arm 112. The expansion and contraction of a bucket cylinder 114 causes the tilt/dump operation of the bucket 111. The expansion and contraction of an arm cylinder 113 causes the lift arm 112 to move up and down.

Figure 2:
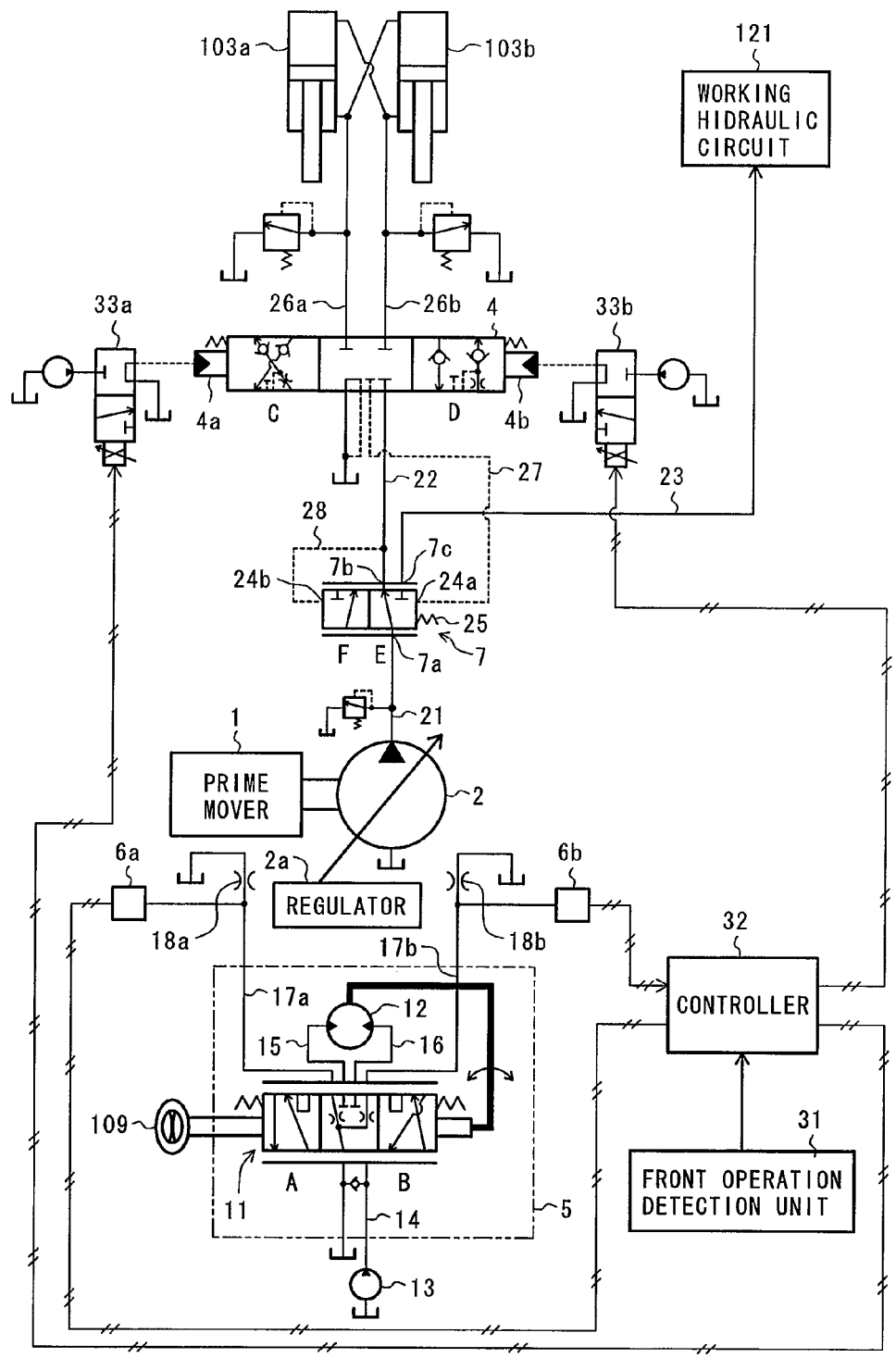
FIG. 2 is a diagram illustrating a steering system of an engineering vehicle according to a first embodiment of the present invention.

FIG. 2 is a diagram illustrating the steering system of an engineering vehicle according to a first embodiment of the present invention.

In FIG. 2, the steering system according to this embodiment includes: a prime mover (diesel engine) 1; a hydraulic pump 2 that is driven by the prime mover and including a variable displacement control unit (regulator) 2a; the pair of steering cylinders 103a and 103b, each of which is driven by pressurized oil discharged from the hydraulic pump 2; a steering valve 4 for controlling the direction and flow of the pressurized oil supplied from the hydraulic pump 2 to the steering cylinders 103a and 103b; a hydraulic steering unit 5 that operates by the rotational operation of the steering wheel 109 with the steering wheel 109 connected thereto and that generates a control pressure in response to the rotational quantity and rotational direction of the steering wheel 109 on the basis of the pressurized oil of a pilot hydraulic fluid source (pump) 13; and a priority valve 7 disposed between the hydraulic pump 2 and the steering valve 4 and designed to control the differential pressure across a meter-in hydraulic line of the steering valve 4 so that the differential pressure is kept at a target value (described later) and to thereby supply by priority the steering cylinders 103a and 103b with the pressurized oil discharged from the hydraulic pump 2 and to supply an operational hydraulic circuit 121 with a surplus of the pressurized oil discharged from the hydraulic pump 2.

The steering valve 4 includes: a spool 4c used as a valve; and a pair of pressure receiving units 4a and 4b that are disposed at both ends of the spool 4c. When the driving pressure is applied to the pressure receiving units 4a and 4b, the spool 4c is driven by the driving pressure, which causes a stroke of the spool 4c to change. The steering valve 4 has metering characteristics such that the aperture area increases with increase in stroke of the spool 4c.

The operational hydraulic circuit 121 supplies pressurized oil to, for example, the bucket cylinder 114 and the arm cylinder 113, which are included in the above-mentioned front work device 104, so that the bucket 111 and the lift arm 112 are operated. The operational hydraulic circuit 121 includes a publicly known control valve unit.

The hydraulic steering unit 5 includes a metering valve 11 and a gerotor 12. When an operator manipulates the steering wheel 109, the metering valve 11 pivotally moves in response to the rotational direction of the steering wheel 109. As a result, the position of the metering valve 11 switches from the neutral position shown in FIG. 2 to either the left operating position A or the right operating position B.

After the metering valve 11 is switched to the position A, the pressurized oil from the pilot hydraulic fluid source 13 is supplied to the gerotor 12 through a hydraulic line 14, the internal passage of the position A of the metering valve 11, and a hydraulic line 15. The supply of the pressurized oil causes the gerotor 12 to rotate. The pressurized oil which has passed through the gerotor 12 further passes through a hydraulic line 16, the internal passage of the position A of the metering valve 11, and a hydraulic line 17a. The pressurized oil is then returned to a tank by means of a restrictor 18a that is located in the hydraulic line 17a. In this case, the restrictor 18a generates a pressure (control pressure) in the hydraulic line 17a in response to the flow rate of the pressurized oil. As described later, the steering valve 11 is switched from the neutral position shown in the figure to the left position C shown in the figure on the basis of the pressure (control pressure) generated by the restrictor 18a.

On the other hand, the rotational operation of the gerotor 12 is fed back to the metering valve 11. After the gerotor 12 measures the flow rate of the pressurized oil in response to a rotational operation amount of the steering wheel 109 (displacement of the metering valve 11) and rotates by a specified amount, the metering valve 11 returns to the neutral position. This blocks the supply of pressurized oil from the hydraulic line 14 to the hydraulic line 15. As a result, the pressure of the pressurized oil in the hydraulic line 17a becomes equivalent to the tank pressure. Consequently, the steering valve 4 returns to the neutral position shown in the figure.

When the metering valve is switched to the position B, the reverse of the above operation is performed. To be more specific, the pressurized oil from the pilot hydraulic fluid source (pump) 13 is supplied to the gerotor 12 through the hydraulic line 14, the internal passage of the position B of the metering valve 11, and the hydraulic line 16. The supply of the pressurized oil causes the gerotor 12 to rotate. The pressurized oil which has passed through the gerotor 12 further passes through the hydraulic line 15, the internal passage of the position B of the metering valve 11, and a hydraulic line 17b. The pressurized oil is then returned to a tank by means of a restrictor 18b that is located in the hydraulic line 17b. In this case, the restrictor 18b generates a pressure (control pressure) in the hydraulic line 17b in response to the flow rate of the pressurized oil. As a result, the position of the steering valve 4 is switched from the neutral position shown in the figure to the right position D shown in the figure.

After the gerotor 12 measures the flow rate of the pressurized oil in response to the rotational operation amount of the steering wheel 109 (displacement of the metering valve 11) and rotates by a specified amount, the metering valve 11 returns to the neutral position. This blocks the supply of pressurized oil from the hydraulic line 14 to the hydraulic line 16. As a result, the pressure of the pressurized oil in the hydraulic line 17b becomes equivalent to the tank pressure. Consequently, the steering valve 4 returns to the neutral position shown in the figure.

The priority valve 7 includes an inlet port 7a and two outlet ports (first and second outlet ports) 7b and 7c. The inlet port 7a is connected to the hydraulic pump 2 through a hydraulic line 21. The first outlet port 7b is connected to the steering valve 4 through a hydraulic line 22. The second outlet port 7c is connected to the operational hydraulic circuit 121 through a hydraulic line 23. In addition, the priority valve 7 is a spool valve that can move between the right switching position E shown in the figure and the left switching position F shown in the figure. When the spool of the priority valve 7 is at the right position E shown in the figure, the communicating passage between the inlet port 7a and the first outlet port 7b is fully opened whereas the communicating passage between the inlet port 7a and the second outlet port 7c is fully closed. When the spool of the priority valve 7 is at the left position F shown in the figure, the communicating passage between the inlet port 7a and the first outlet port 7b is fully closed whereas the communicating passage between the inlet port 7a and the second outlet port 7c is fully opened. Moreover, as the spool of the priority valve 7 moves from the right position E to the left position F shown in the figure (more specifically, as it moves in the right direction in the figure), the aperture area of the communicating passage between the inlet port 7a and the first outlet port 7b is gradually narrowed (decreased), whereas the aperture area of the communicating passage between the inlet port 7a and the second outlet port 7c is gradually widened (increased). In contrast, as the spool of the priority valve 7 moves from the left position F to the right position E shown in the figure (more specifically, as it moves in the left direction in the figure), the aperture area of the communicating passage between the inlet port 7a and the second outlet port 7c is gradually narrowed (decreased), whereas the aperture area of the communicating passage between the inlet port 7a and the first outlet port 7b is gradually widened (increased).

In addition, the priority valve 7 includes: a pressure receiving unit 24a and a spring 25 that bias the spool of the priority valve 7 towards the right position E shown in the figure; and a pressure receiving units 24b that biases the spool of the priority valve 7 towards the left position F shown in the figure. Introduced into the pressure receiving unit 24a through a pilot hydraulic line 27 is the pressure on the outlet side of the steering valve 4 (the pressures of actuator hydraulic lines 26a and 26b between the steering valve 4 and the steering cylinders 103a and 103b, or the load pressures of the steering cylinders 103a and 103b). Introduced into the pressure receiving unit 24b through a pilot hydraulic line 28 is the pressure on the inlet side of the steering valve 4 (the pressure of the hydraulic line 22 between the priority valve 7 and the steering valve 4).

Because the pressure receiving units 24a and 24b each bias the spool of the priority valve 7 in an opposite direction, the pressure on the outlet side of the steering valve 4 is introduced into the pressure receiving unit 24a, and the pressure on the inlet side of the steering valve 4 is introduced into the pressure receiving unit 24b. This means that the differential pressure across the meter-in hydraulic line of the steering valve 4 (hereinafter merely referred to as "the differential pressure across the steering valve 4" as necessary) works so as to bias the spool of the priority valve 7 in the right direction in the figure.

The spring 25 constitutes a part of setting means for setting a target value of the differential pressure across the steering valve 4. When the differential pressure across the steering valve 4 which acts on the pressure receiving units 24a and 24b of the priority valve 7 becomes higher than the target value that is set by the spring 25, the spool of the priority valve 7 is moved in the right direction in the figure, and the aperture area of the communicating passage between the inlet port 7a and the first outlet port 7b is gradually narrowed to decrease the flow rate of the supply to the steering valve 4, thereby reducing the differential pressure across the steering valve 4. At this time, a surplus flow from the hydraulic pump 2 is supplied to the operational hydraulic circuit 121. In contrast, the differential pressure across the steering valve 4 which acts on the pressure receiving units 24a and 24b of the priority valve 7 becomes lower than the target value set by the spring 25, the spool of the priority valve 7 is moved in the left direction in the figure, and the aperture area of the communicating passage between the inlet port 7a and the first outlet port 7b is gradually widened to increase the flow rate of the supply to the steering valve 4, thereby increasing the differential pressure across the steering valve 4. With the above mechanism, the priority valve 7 controls the differential pressure across the meter-in hydraulic line of the steering valve 4 so that the differential pressure is kept at the target value set by the spring 25 (the setting means).

The steering system according to this embodiment further includes: a pressure sensor 6a for detecting the pressure (the control pressure) that is generated by the restrictor 18a located in the oil channel 17a; a pressure sensor 6b for detecting the pressure (the control pressure) that is generated by the restrictor 18b located in the oil channel 17b; a front operation detection unit 31; a controller 32; and solenoid valves 33a and 33b. A detection signal of the front operation detection unit 31 as well as detection signals of the pressure sensors 6a and 6b is inputted into the controller 32. The controller 32 performs specified arithmetic processing in response to the input values, and outputs specified control currents to the solenoid valves 33 and 33b respectively. The solenoid valves 33a and 33b operate with the control currents and output driving pressures corresponding to the control currents. The driving pressures are then introduced into the pressure receiving units 4a and 4b of the priority valve 4 respectively.

Figure 3:
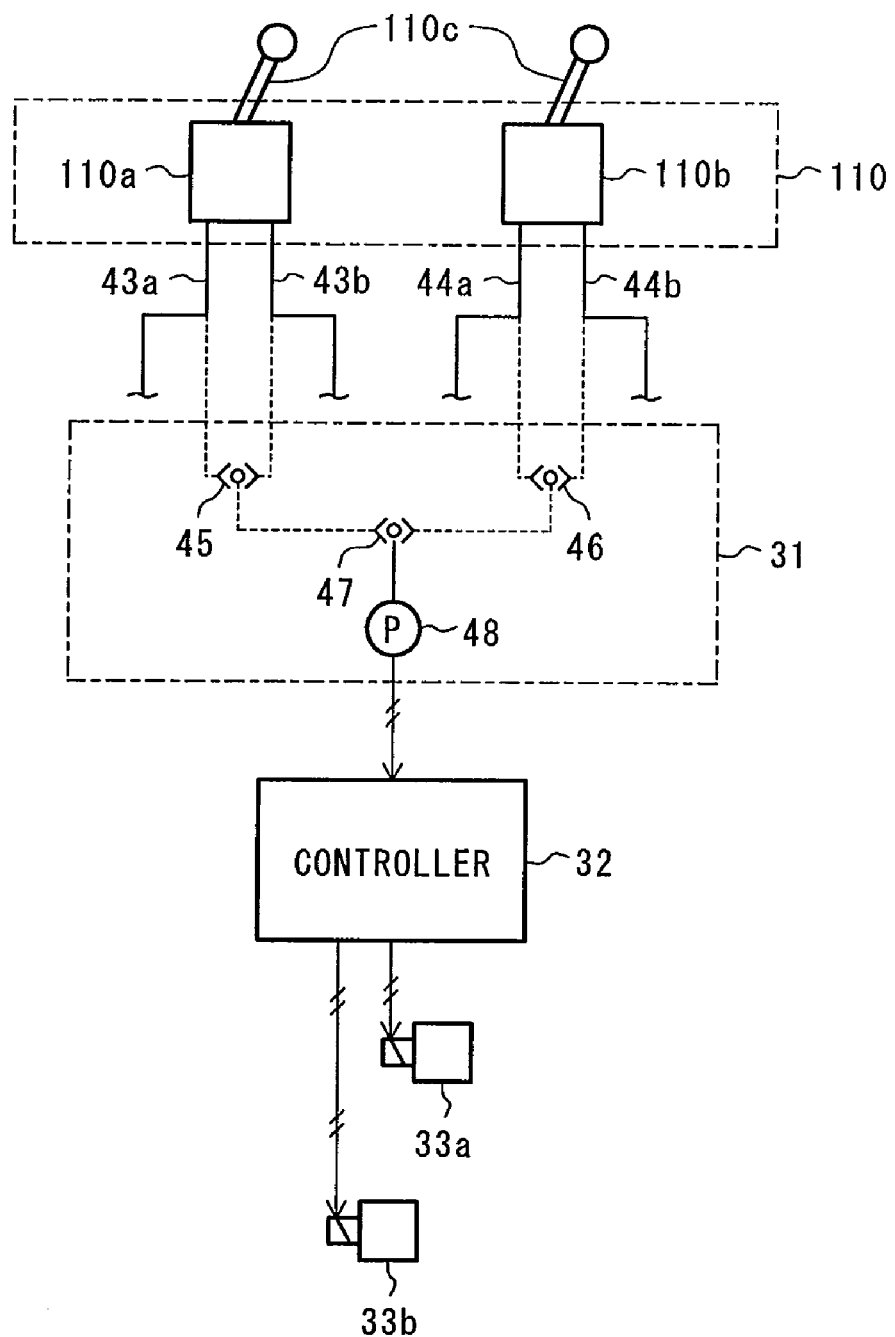
FIG. 3 is a diagram illustrating in detail an example of a front operation detection unit.

FIG. 3 is a diagram illustrating an example of a front operation detection unit. As described above, the cabin 106 of the wheel loader is equipped with the control lever unit 110. This control lever unit 110 includes a control lever 110c that can be universally manipulated. When the control lever 110c is manipulated in one direction of two directions that cross each other (for example, in a forward-backward direction), the control lever 110c functions as a control lever unit 110a used for the bucket 111 of the front work device 104. In contrast, when the control lever 110c is manipulated in the other direction of the two directions that cross each other (for example, in a right-left direction), the control lever 110c functions as a control lever unit 11b used for the lift arm 112 of the front work device 104. In addition, the control lever units 110a and 110b are based on a hydraulic pilot system. Each of the control lever units 110a and 110b generates a control pilot pressure in response to the control amount of the control lever 110c in each control direction, and in response to each of the control directions that are switched to each other at a neutral position. The control pilot pressure is introduced into a bucket control valve and a lift-arm control valve, both of which are not illustrated, through a pilot hydraulic line 43a or 43b and a pilot hydraulic line 44a or 44b. The bucket cylinder 114 and the arm cylinder 113 are driven and controlled by switching these control valves. The bucket control valve and the lift-arm control valve constitute a part of the control valve unit included in the operational hydraulic circuit 121.

A shuttle valve 45 is connected to the pilot hydraulic lines 43a and 43b. A shuttle valve 46 is connected to the pilot hydraulic lines 44a and 44b. A shuttle valve 47 is further connected to the output side of the shuttle valves 45 and 46. The highest control pilot pressure among control pilot pressures generated in the pilot hydraulic lines 43a and 43b and in the pilot hydraulic lines 44a and 44b is extracted by the shuttle valve 47. The pressure sensor 48 is connected to the output side of the shuttle valve 47 so that the pressure sensor 48 can detect the pressure extracted by the shuttle valve 47. A detection signal of the pressure sensor 48 is inputted into the controller 32 as a front operation signal. The shuttle valves 45 through 47 and the pressure sensor 48 constitute the front operation detection unit 31.

Figure 4:
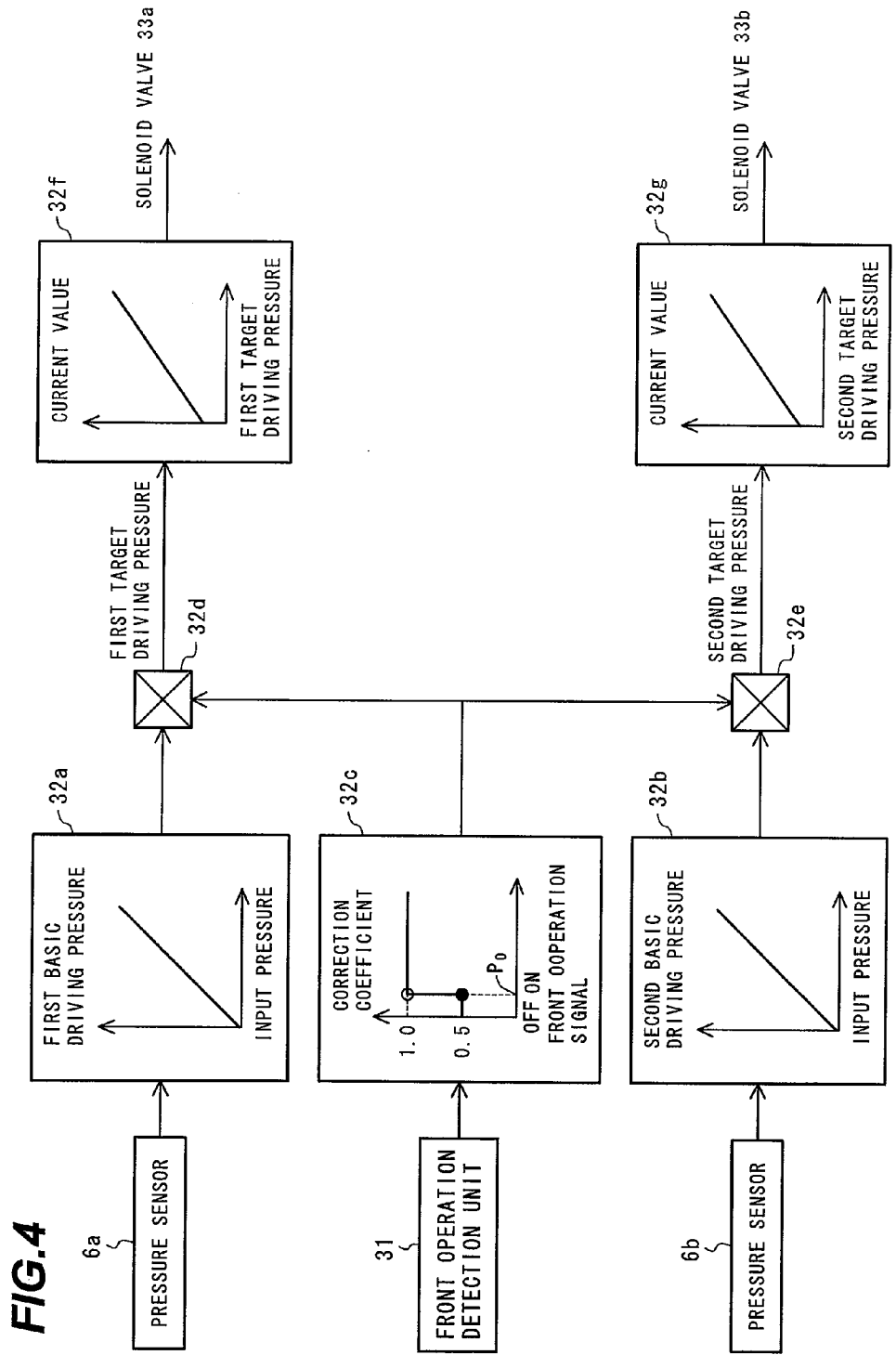
FIG. 4 is a functional block diagram illustrating processing by a controller.

FIG. 4 is a functional block diagram illustrating the processing of the controller 32. The controller 32 includes a first basic driving pressure operation unit 32a, a second basic driving pressure operation unit 32b, a modification coefficient operation unit 32c, a first target driving pressure operation unit 32d, a second target driving pressure operation unit 32e, a first control current operation unit 32f, and a second control current operation unit 32g.

The first basic driving pressure operation unit 32a calculates a basic value of the output pressure (first driving pressure) of the solenoid valve 33a. The output pressure is introduced into the pressure receiving unit 4a of the steering valve 4 so as to control a right stroke of the steering valve 4 shown in the figure. The first basic driving pressure operation unit 32a inputs a pressure detection signal from the pressure sensor 6a, refers to a table stored in a memory, and thereby calculates the first basic driving pressure corresponding to the pressure at that point of time. The table stored in the memory specifies the relationship between the input pressure and the first basic driving pressure in such a manner that the first basic driving pressure increases with increase in input pressure.

The second basic driving pressure operation unit 32b calculates a basic value of the output pressure (second driving pressure) of the solenoid valve 33b. The output pressure is introduced into the pressure receiving unit 4b of the steering valve 4 so as to control a left stroke of the steering valve 4 shown in the figure. The second basic driving pressure operation unit 32b inputs a pressure detection signal from the pressure sensor 6b, refers to a table stored in the memory, and thereby calculates the second basic driving pressure corresponding to the pressure at that point of time. The table stored in the memory specifies the relationship between the input pressure and the second basic driving pressure in such a manner that the second basic driving pressure increases with increase in input pressure.

The modification coefficient operation unit 32c calculates a modification coefficient of the driving pressure in response to whether or not the front work device 104 has been operated (hereinafter referred to as "front operation"). The modification coefficient operation unit 32c inputs a front operation signal (the control pilot pressure detected by the pressure sensor 48) from the front operation detection unit 31, refers to the table stored in the memory, and thereby calculates a modification coefficient corresponding to the front operation signal at that point of time. For example, it is assumed that a threshold value of the control pilot pressure is P0. The control pilot pressure is a front operation signal at which an operator is judged to have operated the control lever 110c of the control lever unit 110. The table stored in the memory specifies the relationship between the front operation signal (the control pilot pressure) and the modification coefficient in such a manner that when the control pilot pressure detected by the pressure sensor 48 is lower than the threshold value P0, the modification coefficient is kept at a first value that is small (for example, the first value is 0.5), whereas when the control pilot pressure is higher than or equal to the threshold value P0, the modification coefficient is kept at a second value that is larger than the first value (for example, the second value is 1.0).

The first target driving pressure operation unit 32d, which is a multiplication unit, multiplies the first basic driving pressure calculated by the first basic driving pressure operation unit 32a by the modification coefficient calculated by the modification coefficient operation unit 32c to determine a first target driving pressure.

The second target driving pressure operation unit 32e, which is a multiplication unit, multiplies the second basic driving pressure calculated by the second basic driving pressure operation unit 32b by the modification coefficient calculated by the modification coefficient operation unit 32c to determine a second target driving pressure.

The first control current operation unit 32f refers to the table stored in the memory for the first target driving pressure calculated by the first target driving pressure operation unit 32d so that a control current of the solenoid valve 33a corresponding to the first target driving pressure is calculated. The table stored in the memory specifies the relationship between the first target driving pressure and the control current in such a manner that the control current increases with increase in first target driving pressure. This control current is amplified by an amplifier (not shown) and is then output to the solenoid valve 33a.

The second control current operation unit 32g refers to the table stored in the memory for the second target driving pressure calculated by the second target driving pressure operation unit 32e so that a control current of the solenoid valve 33b corresponding to the second target driving pressure is calculated. The table stored in the memory specifies the relationship between the second target driving pressure and the control current in such a manner that the control current increases with increase in second target driving pressure. This control current is amplified by an amplifier (not shown), and is then output to the solenoid valve 33b.

As described above, the hydraulic steering unit 5, the pressure sensors 6a and 6b (the first and second pressure sensors), the controller 32, and the solenoid valves 33a and 33b constitute steering operation control means that controls a switching direction of the steering valve 4 and a flow rate thereof on the basis of the rotational operation of the steering wheel 109 and an operational state of the front work device 101 detected by the front operation detection unit 31 (front operation detection means).

In addition, the controller 32 and the solenoid valves 33a and 33b constitute control means that controls a stroke of the steering valve 4 on the basis of the control pressures (the first and second control pressures) detected by the pressure sensors 6a and 6b (the first and second pressure sensors) respectively, and on the basis of an operational state of the front work device 101 detected by the front operation detection unit 31 (the front operation detection means). The control means controls the stroke of the steering valve 4 so that the stroke in question is increased with increase in control pressure detected by each of the pressure sensors 6a and 6b, and so that when the operation of the front work device 101 is detected by the front operation detection unit 31, the stroke of the steering valve 4 becomes larger than that provided when the operation of the front work device 101 is not detected.

Next, the operation of this embodiment as configured above will be described.

First of all, a case where an operator carries out simultaneous operation of both the traveling and the operation of the front work device 101 is considered. In this case, when the front work device 101 is operated, a value of the front operation signal from the front operation detection unit 31 (the control pilot pressure detected by the pressure sensor 48) is higher than or equal to the threshold value P0 set by the modification coefficient operation unit 32c of the controller 32. Accordingly, the modification coefficient operation unit 32c determines as the modification coefficient a second value that is somewhat larger (for example, 1.0).

In addition, in the case where the operator carries out the simultaneous operation of both the traveling and the operation of the front work device 101, when the operator manipulates the steering wheel 109 to switch the metering valve 11 to, for example, the position A side, a pressure is generated in the hydraulic line 17a. This pressure is detected by the pressure sensor 6a. The controller 32 then calculates a first basic driving pressure corresponding to the pressure by the first basic driving pressure operation unit 32a. The first target driving pressure operation unit 32d multiplies the first basic driving pressure by the second value that is somewhat larger, and thereby calculates a first target driving pressure. The first control current operation unit 32f then calculates a control current corresponding to the first target driving pressure, and outputs the corresponding control current to the solenoid valve 33a. The control current causes the solenoid valve 33a to operate so as to generate a driving pressure corresponding to the first target driving pressure. The driving pressure is then introduced into the pressure receiving unit 4a of the steering valve 4. As a result, the steering valve 4 drives the spool 4c to the position C side in response to the driving pressure, which causes a stroke to change. Consequently, the aperture area in response to the stroke is set. In this case, the aperture area of the steering valve 4 becomes large corresponding to the second value of the modification coefficient. This results in an increase in flow rate of the steering valve 4, which makes the driving speed of the steering cylinders 103a and 103b (the steering speed of wheels) higher with respect to the rotational operation of the steering wheel 109. Therefore, in the case where the operator carries out the simultaneous operation of both the traveling and the operation of the front work device 101, the operator's fatigue during the steering operation is reduced, which leads to an improvement in work efficiency.

In contrast, in the case of traveling only, a value of the front operation signal from the front operation detection unit 31 (the control pilot pressure detected by the pressure sensor 48) is smaller than the threshold value P0 set by the modification coefficient operation unit 32c. The modification coefficient operation unit 32c, therefore, determines as the modification coefficient a first value that is smaller (for example, 0.5).

In addition, in the case of traveling only, when the operator manipulates the steering wheel 109 to switch the metering valve 11 to, for example, the position A side, a pressure is generated in the hydraulic line 17a. This pressure is detected by the pressure sensor 6a. The controller 32 then calculates a first basic driving pressure corresponding to the pressure by the first basic driving pressure operation unit 32a. The first target driving pressure operation unit 32d multiplies the first basic driving pressure by the first value that is somewhat smaller, and thereby calculates a first target driving pressure. The first control current operation unit 32f then calculates a control current corresponding to the first target driving pressure, and outputs the corresponding control current to the solenoid valve 33a. The control current causes the solenoid valve 33a to operate so as to generate a driving pressure corresponding to the first target driving pressure. The driving pressure is then introduced into the pressure receiving unit 4a of the steering valve 4. As a result, the steering valve 4 drives the spool 4c to the position C side in response to the driving pressure, which causes a stroke to change. Consequently, the aperture area in response to the stroke (more specific, the smaller aperture area in response to the first value of the modification coefficient) is set. This results in a decrease in flow rate of the steering valve 4, which makes the driving speed of the steering cylinders 103a and 103b (the steering speed of the wheels) lower with respect to the rotational operation of the steering wheel 109. Therefore, in the case of traveling only, the security during the steering operation is improved.

Also when the operator manipulates the steering wheel 109 to switch the metering valve 11 to the position B side, the operation is performed in like manner.

Thus, according to this embodiment, in the case where the operator carries out the simultaneous operation of both the traveling and the operation of the front work device 101, and in the case of traveling only, the wheel steering speed is kept at an optimum value with respect to the rotational operation of the steering wheel 109. Therefore, the work efficiency and security can be ensured.

In addition, when the front work device 101 is manipulated, the wheel steering speed is automatically changed. This eliminates the need for the operator's operation, and accordingly, high operability can be achieved.

Moreover, the control pressure generated by the hydraulic steering unit 5 is detected, and a stroke of the steering valve 4 is then controlled so that the stroke becomes larger with increase in the detected control pressure. Therefore, the hydraulic steering unit 5 can perform the rotational operation of the steering wheel 4 with weaker force in comparison with that required by a method in which the steering valve 4 is directly driven. Also on this point, the high operability can be achieved.

A second embodiment of the present invention will be described with reference to FIG. 5.

According to the first embodiment described above, for the table used for the calculation by the modification coefficient operation unit 32c shown in FIG. 4, the threshold value of the front operation signal (the control pilot pressure) is set at the value P0 at which the operator is judged to have operated the control lever 110c of the control lever unit 110. However, in this embodiment, the threshold value is set at a different value.

Figure 5:
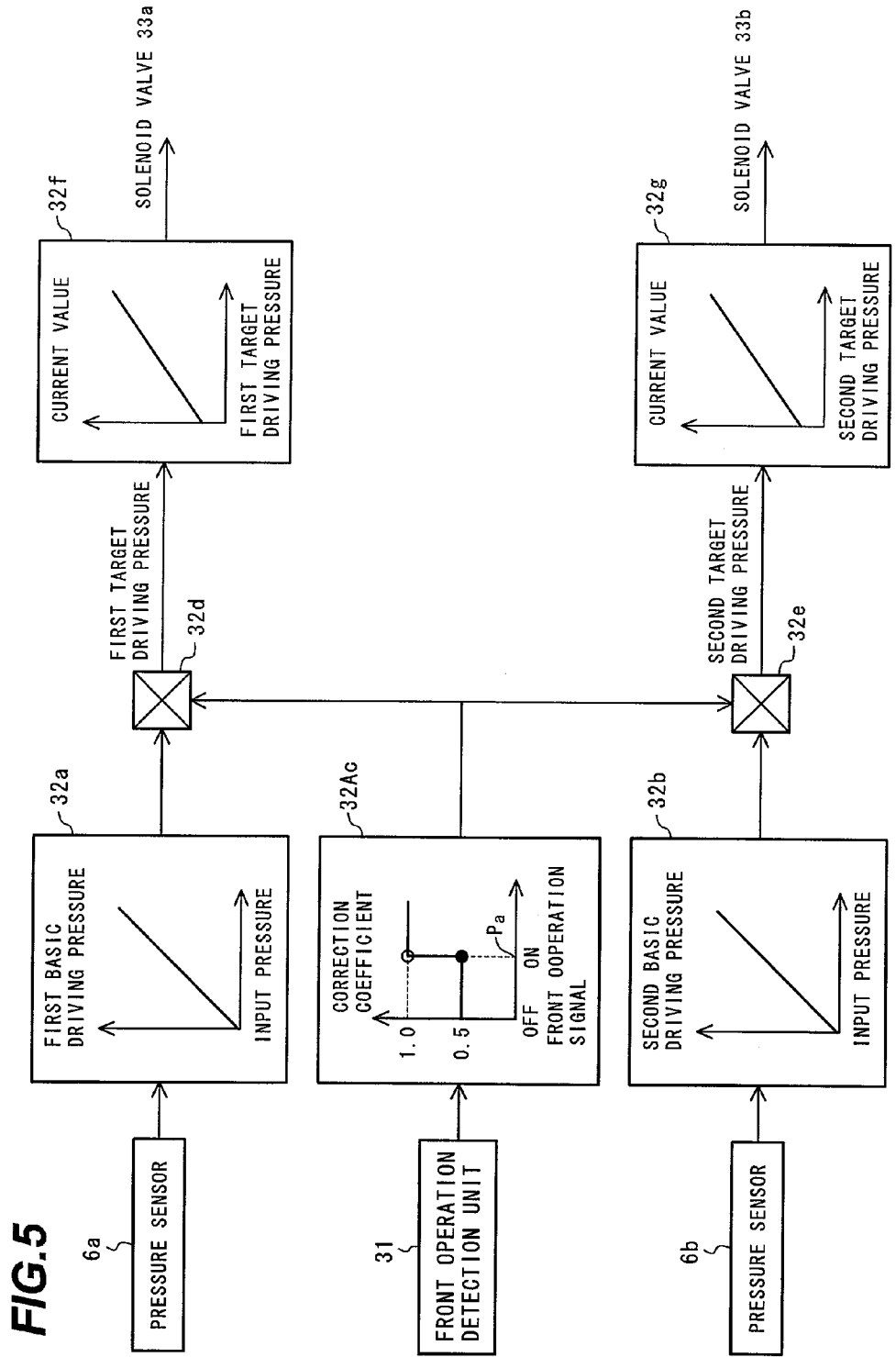
FIG. 5 is a functional block diagram illustrating processing by a controller included in a steering system of an engineering vehicle according to a second embodiment of the present invention.

To be more specific, in this embodiment, the relationship between the front operation signal (the control pilot pressure) and the modification coefficient is specified in the table of the modification coefficient operation unit 32Ac shown in FIG. 5. A range of the front operation signal (the control pilot pressure) along the horizontal axis is divided into two as follows: a control pilot pressure range covering slight-move operational work requiring carefulness, within which movement of the front work device is relatively small; and a control pilot pressure range covering normal operational work, within which the movement of the front work device is relatively large. A value Pa of the control pilot pressure, which corresponds to the boundary between the two ranges, is specified as the threshold value.

Even in the case where the operator carries out the simultaneous operation of both the traveling and the operation of the front work device 101, when the bucket 111 of the front work device 101 contains a load, or when careful operation is tried with the bucket 111 kept at an upward position, if the steering speed becomes high at the time of the manipulation of the steering wheel 109, there is a possibility that the load contained in the bucket will drop, or that the behavior of the car body will be disordered.

According to this embodiment, in the case of the simultaneous operation of both the traveling and the operation of the front work device, when the operator performs the slight-move operational work requiring carefulness, in which the movement of the front work device is relatively small, the control pilot pressure is lower than or equal to the threshold value Pa. Accordingly, the modification coefficient is kept at the first value that is small (for example, the first value is 0.5). Therefore, a stroke of the steering valve 4 is so controlled that the stroke becomes smaller, which enables the operator to precisely and correctly perform the slight-move operational work. As a result, the operator can prevent the load from dropping from the front work device 101, and can also prevent the behavior of the car body from being disordered. In contrast, when the operator performs the normal operational work in which the movement of the front work device 101 is relatively large, the control pilot pressure exceeds the threshold value Pa. Accordingly, the modification coefficient is kept at the second value that is larger (for example, the second value is 1.0). Therefore, the stroke of the steering valve 4 is so controlled that it becomes larger, which enable the operator to easily manipulate the steering wheel during the simultaneous operation of both the traveling and the operation of the front work device. As a result, the operator's fatigue is reduced, leading to an improvement in work efficiency.

Thus, the same effects as those of the first embodiment can be produced by this embodiment. In addition to it, the operator can precisely and correctly perform the slight-move operational work during the simultaneous operation of both the traveling and the operation of the front work device.

A third embodiment of the present invention will be described with reference to FIGS. 6 and 7.

Figure 6:
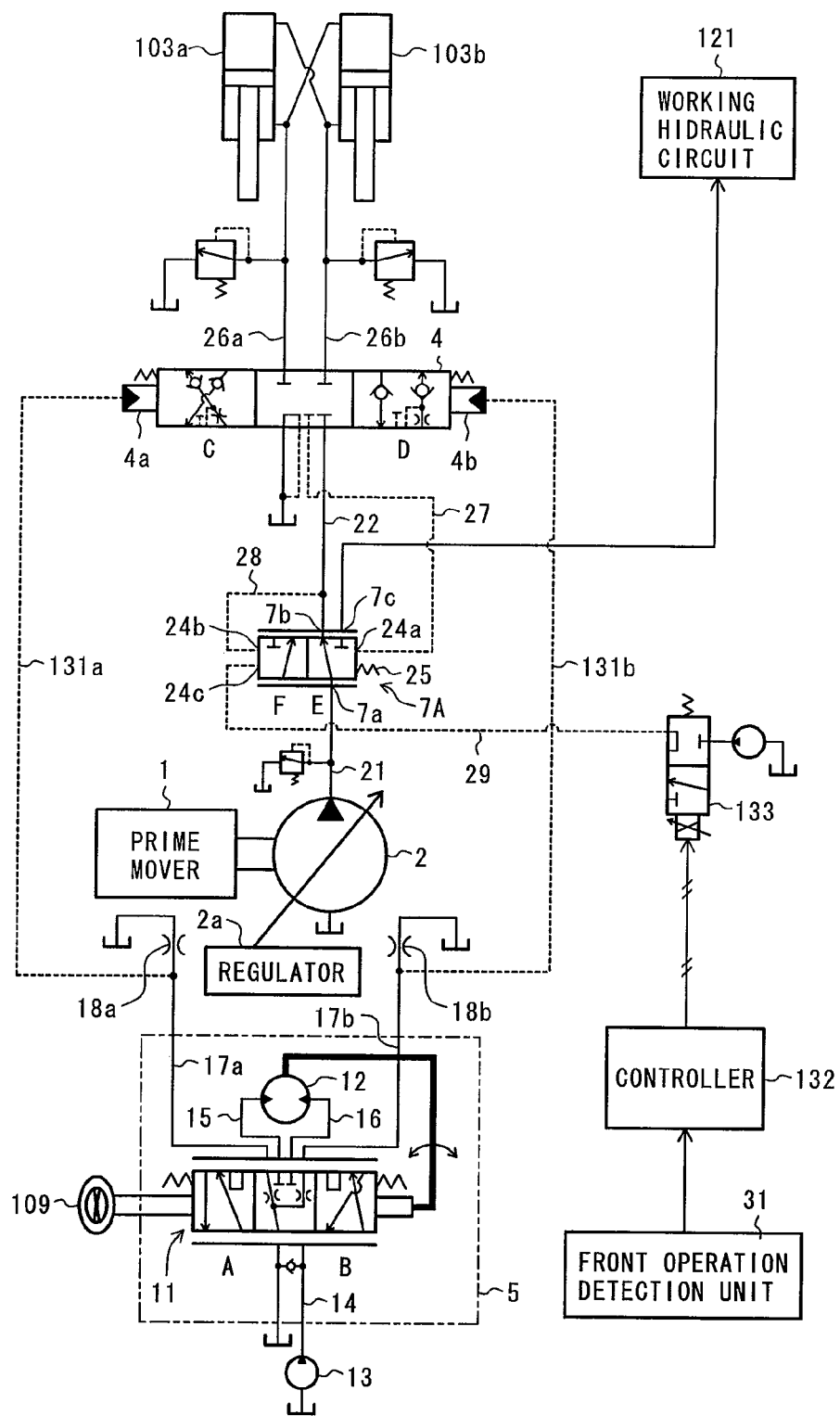
FIG. 6 is a diagram illustrating a steering system of an engineering vehicle according to a third embodiment of the present invention.

FIG. 6 is a diagram illustrating a steering system of an engineering vehicle according to this embodiment.

In FIG. 6, instead of the pressure sensors 6a and 6b and the solenoid valves 33a and 33b shown in FIG. 1, the steering system according to this embodiment has pilot hydraulic lines 131a and 131b for introducing the control pressure generated by the hydraulic steering unit 5 into pressure receiving units 4a and 4b of the steering valve 4. The pilot hydraulic lines 131a and 131b are used to directly switch the steering valve 4 by the control pressure generated in the hydraulic steering unit 5.

In addition, instead of the priority valve 7 shown in FIG. 1, the steering system according to this embodiment has a priority valve 7A that is capable of changing a target value of the differential pressure across a meter-in hydraulic line of the steering valve 4.

To be more specific, as is the case with the priority valve 7 in the first embodiment, the priority valve 7A includes: the pressure receiving unit 24a and the spring 25 that bias the spool of the priority valve 7A towards the right position E shown in the figure; the pressure receiving unit 24b that biases the spool of the priority valve 7A towards the left position F shown in the figure; and the second pressure receiving unit 24c that biases the spool of the priority valve 7A towards the left position F shown in the figure. The control pressure is introduced into the pressure receiving chamber 24c through the pilot hydraulic line 29.

The spring 25 constitutes settings means for setting a target value of the differential pressure across the steering valve 4. The pressure receiving unit 24c constitutes target-value modification means for modifying the target value of the differential pressure set by the spring 25. If the differential pressure across the steering valve 4 which acts on the pressure receiving units 24a and 24b of the priority valve 7A becomes higher than the target value that is set by the spring 25 and modified by the pressure receiving unit 24c, the spool of the priority valve 7A is moved in the right direction shown in the figure, and the aperture area of the communicating passage between the inlet port 7a and the first outlet port 7b is gradually narrowed to decrease a flow rate of the supply to the steering valve 4, thereby reducing the differential pressure across the steering valve 4. At this time, a surplus flow from the hydraulic pump 2 is supplied to the operational hydraulic circuit 121. In contrast, if the differential pressure across the steering valve 4 which acts on the pressure receiving unit 24a and 24b of the priority valve 7A becomes lower than the target value that is set by the spring 25 and the pressure receiving unit 24c, the spool of the priority valve 7A is moved in the left direction shown in the figure, and the aperture area of the communicating passage between the inlet port 7a and the first outlet port 7b is gradually widened to increase the flow rate of the supply to the steering valve 4, thereby increasing the differential pressure across the steering valve 4. With the above mechanism, the priority valve 7A controls the differential pressure across the meter-in hydraulic line of the steering valve 4 so that the differential pressure is kept at the target value that has been set by the spring 25, and that has been modified by the pressure receiving unit 24c.

Here, the spring 25 sets a basic value (constant value) of the target value; and the pressure receiving unit 24c adjusts the basic value by the control pressure, thereby setting the target value as a variable. The control pressure to be introduced into the pressure receiving unit 24c is set at a value smaller than a pressure value corresponding to the biasing force of the spring 25 so that the sum of the biasing force of the spring 25 and that of the pressure receiving unit 24c acts in the left direction in the figure. The spring 25 and the pressure receiving unit 24c can also be said to constitute settings means for setting a target value of the differential pressure across the steering valve 4.

Moreover, as is the case with the first embodiment, the steering system according to this embodiment includes the front operation detection unit 31, the controller 132, and the solenoid valve 133. A detection signal detected by the front operation detection unit 31 is inputted into the controller 132. The controller 132 performs specified arithmetic processing, and then outputs a control current to the solenoid valve 133. The solenoid valve 133 operates with the control current, and then outputs a control pressure corresponding to the control current. This control pressure is introduced into the pressure receiving unit 24c of the priority valve 7A through the pilot hydraulic line 29.

Figure 7:
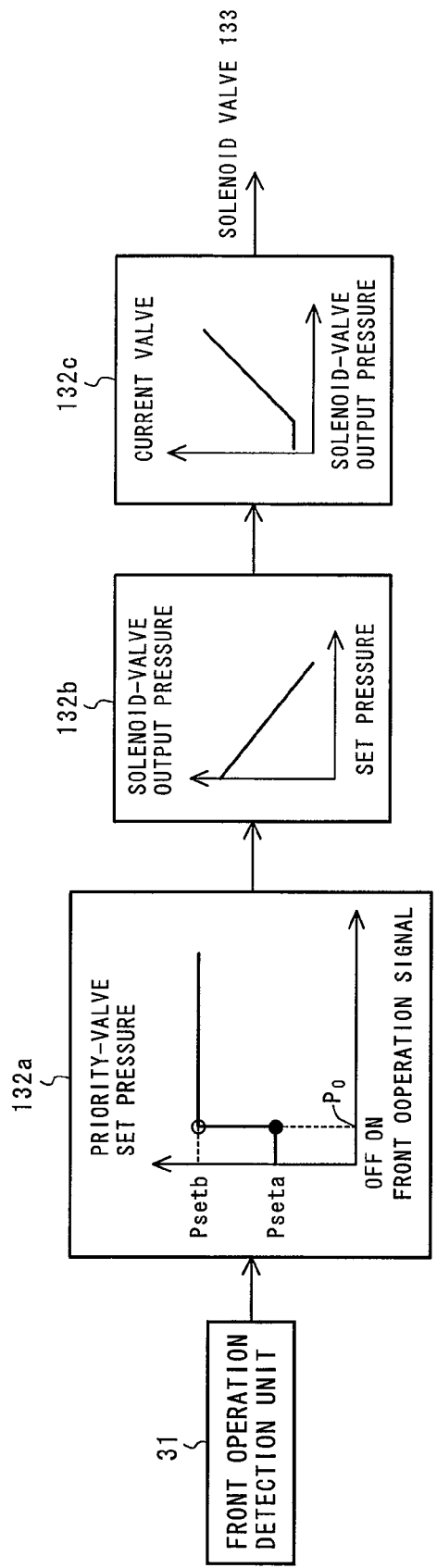
FIG. 7 is a functional block diagram illustrating processing by a controller.

FIG. 7 is a functional block diagram illustrating the processing of the controller 132. The controller 132 includes a priority valve set pressure operation unit 132a, a solenoid-valve output pressure operation unit 132b, and a control current operation unit 132c.

The priority valve set pressure operation unit 132a calculates a priority valve set pressure corresponding to the front operation. More specifically, the priority valve set pressure operation unit 132a inputs a front operation signal (the control pilot pressure detected by the pressure sensor 48 shown in FIG. 3) from the front operation detection unit 31, and refers to a table stored in the memory to calculate the set pressure corresponding to the front operation signal at that point of time. For example, it is assumed that a threshold value of the control pilot pressure is P0. The control pilot pressure is a front operation signal at which an operator is judged to have operated the control lever 110c of the control lever unit 110. The table stored in the memory specifies the relationship between the front operation signal (the control pilot pressure) and the set pressure in such a manner that when the control pilot pressure detected by the pressure sensor 48 is lower than the threshold value P0, the set pressure is kept at a first value that is small (for example, the first value is Pseta), whereas when the control pilot pressure is higher than or equal to the threshold value P0, the set pressure is kept at a second value Psetb that is higher than the first value Pseta. Here, as described above, the priority valve set pressure calculated by the operation unit 132a means a target value of the differential pressure across the steering valve 4 set by the settings means that is constituted of the spring 25 and pressure receiving unit 24c of the priority valve 7A. The first value Pseta is, for example, 20 kg/cm$^2$; and the second value Psetb is, for example, 30 kg/cm$^2$.

The solenoid-valve output pressure operation unit 32b calculates an output pressure (control pressure) of the solenoid valve 33, which is used to acquire the set pressure calculated by the priority valve set pressure operation unit 32a. The solenoid-valve output pressure operation unit 32b refers to a table of the set pressure, which is stored in the memory, so as to calculate the output pressure of the solenoid valve 33 corresponding to the set pressure. The table stored in the memory specifies the relationship between the set pressure and the output pressure in such a manner that the output pressure decreases with increase in set pressure. Here, for example, on the assumption that a pressure conversion value (basic value) of the biasing force of the spring 25 on the left side in the figure is 30 kg/cm$^2$, if the priority valve set pressure calculated by the operation unit 32a is 20 kg/cm$^2$ that is the first value Pseta, the control pressure calculated by the solenoid-valve output pressure operation unit 32b is 10 kg/cm$^2$. In contrast, if the priority valve set pressure calculated by the operation unit 32a is 30 kg/cm$^2$ that is the second value Psetb, the control pressure calculated by the solenoid-valve output pressure operation unit 32b is 0 kg/cm$^2$.

The control current operation unit 32c calculates a control current (driving current) of the solenoid valve 35 to acquire the output pressure of the solenoid valve 33 determined by the solenoid-valve output pressure operation unit 32b. The control current operation unit 32c refers to a table stored in the memory for the output pressure of the solenoid valve 33 determined by the solenoid-valve output pressure operation unit 32 so that the control current of the solenoid valve 33 corresponding to the output pressure is calculated. The table stored in the memory specifies the relationship between the output pressure and the control current in such a manner that the control current increases with increase in output pressure. This control current is amplified by an unillustrated amplifier, and is then output to the solenoid valve 33.

As described above, the hydraulic steering unit 5, the pilot hydraulic lines 131a and 131b, the controller 132, the solenoid valve 133, the pilot hydraulic line 29, and the pressure receiving unit 24c of the priority valve 7A constitute steering operation control means for controlling the switching direction and flow rate of the steering valve 4 on the basis of the rotational operation of the steering wheel 109 and an operational state of the front work device 101 detected by the front operation detection unit 31 (front operation detection means).

In addition, the controller 132, the solenoid valve 33, the pilot hydraulic line 29, and the pressure receiving unit 24c of the priority valve 7A constitute control means for changing a target value of the differential pressure across the steering valve 4 set by the spring 25, which is settings means of the priority valve 7A, in response to the operational state of the front work device 101 detected by the front operation detection unit 31 (front operation detection means).

According to this embodiment that is configured as above, when the front work device 101 is manipulated, the priority valve set pressure operation unit 132a of the controller 132 calculates as the set pressure the second value Psetb that is larger. The control pressure corresponding to the value is then introduced into the pressure receiving unit 24c of the priority valve 7A. The priority valve 7A is provided with the value as a target value of the differential pressure across the steering valve 4. The priority valve 7A controls the differential pressure across the steering valve 4 so that the differential pressure is kept at the target value. This results in an increase in flow rate of the steering valve 4, which makes the driving speed of the steering cylinders 103a and 103b (the steering speed of wheels) higher with respect to the rotational operation of the steering wheel 109. Therefore, in the case where the operator carries out the simultaneous operation of both the traveling and the operation of the front work device 101, the operator's fatigue during the steering operation is reduced, which leads to an improvement in work efficiency.

In contrast, in the case of traveling only, the priority valve set pressure operation unit 132a of the controller 132 calculates as the set pressure the first value Pseta that is smaller. The control pressure corresponding to the value is then introduced into the pressure receiving unit 24c of the priority valve 7A. The priority valve 7A is provided with the value as a target value of the differential pressure across the steering valve The priority valve 7A controls the differential pressure across the steering valve 4 so that the differential pressure is kept at the target value. This results in a decrease in flow rate of the steering valve 4, which makes it possible to prevent the driving speed of the steering cylinders 103a and 103b (the steering speed of the wheels) from increasing with respect to the rotational operation of the steering wheel 109. Therefore, in the case of traveling only, the security during the steering operation is improved.

Moreover, as is the case with the first embodiment, the rotational operation of the steering wheel 109 can be performed with weaker force, and accordingly, the high operability can be achieved. In addition to it, even in the case where a failure occurs in an electrical system including the controller 132, and the solenoid valve 33, steering operation of the wheel loader can be reliably carried out. As a result, a high level of security can be ensured.

A fourth embodiment of the present invention will be described with reference to FIG. 8.

According to the third embodiment described above, for the table used for the calculation made by the priority valve set pressure operation unit 132a shown in FIG. 7, the threshold value of the front operation signal (the control pilot pressure) is set at the value P0 at which the operator is judged to have operated the control lever 110c of the control lever unit 110. However, as is the case with the modification of the first embodiment according to the second embodiment, the threshold value is set at a different value in this embodiment.

Figure 8:
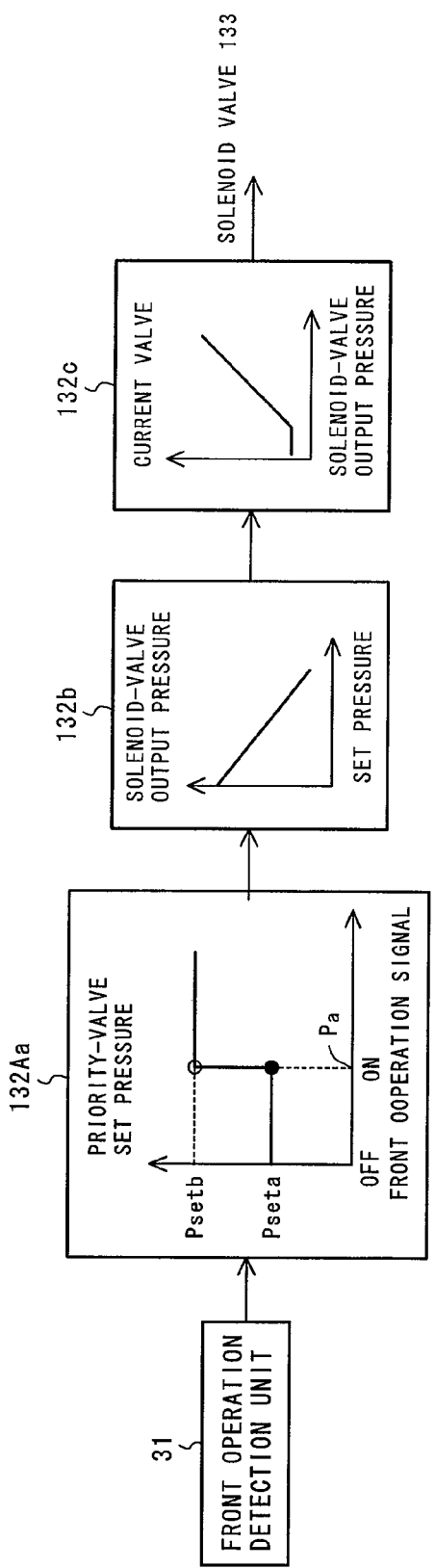
FIG. 8 is a functional block diagram illustrating processing by a controller included in a steering system of an engineering vehicle according to a fourth embodiment of the present invention.

To be more specific, in this embodiment, the relationship between the front operation signal (the control pilot pressure) and the set pressure of the priority valve 7a is specified in the table of the priority valve set pressure operation unit 132a shown in FIG. 8. A range of the front operation signal (the control pilot pressure) along the horizontal axis is divided into two as follows: a control pilot pressure range covering slight-move operational work requiring carefulness, within which the movement of the front work device is relatively small; and a control pilot pressure range covering normal operational work, within which the movement of the front work device is relatively large. A value Pa of the control pilot pressure, which corresponds to the boundary between the two ranges, is specified as the threshold value.

As a result, in the case of the simultaneous operation of both the traveling and the operation of the front work device, when the operator performs the slight-move operational work requiring carefulness, in which the movement of the front work device is relatively small, the control pilot pressure is lower than or equal to the threshold value Pa. Accordingly, the set pressure of the priority valve 7A is kept at the first value Pseta that is smaller (for example, the first value is 20 Kg/cm$^2$). Therefore, the differential pressure across the steering valve 4 is so controlled that the differential pressure is decreased, which enables the operator to precisely and correctly perform the slight-move operational work. As a result, the operator can prevent the load from dropping from the front work device 101, and can also prevent the behavior of the car body from being disordered. In contrast, when the operator performs the normal operational work in which the movement of the front work device 101 is relatively large, the control pilot pressure exceeds the threshold value Pa. Accordingly, the set pressure of the priority valve 7A is kept at the second value Psetb that is larger (for example, the second value is 30 Kg/cm$^2$). Therefore, the differential pressure across the steering valve 4 is so controlled that it is increased, which enables the operator to easily manipulate the steering wheel during the simultaneous operation of both the traveling and the operation of the front work device. As a result, the operator's fatigue is reduced, leading to an improvement in work efficiency.

The invention claimed is:

1. A steering system for an engineering vehicle comprising:
    a hydraulic pump;
    a steering cylinder driven by pressurized oil discharged from the hydraulic pump;
    a steering valve for controlling the direction and flow rate of the pressurized oil supplied from the hydraulic pump to the steering cylinder; and
    a steering wheel manipulated by an operator,
    said steering system switching the steering valve based on the rotational operation of the steering wheel so as to control the steering cylinder,
    wherein said steering system further comprising:
    front operation detection means for detecting an operational state of a front work device disposed on a vehicle front part of the engineering vehicle; and
    steering operation control means for controlling the switching direction and flow rate of the steering valve on the basis of the rotational operation of the steering wheel and the operational state of the front work device detected by said front operation detection means.

2. The steering system for the engineering vehicle according to claim 1,
    wherein said steering operation control means includes:
    a hydraulic steering unit to which the steering wheel is coupled, the hydraulic steering unit operating by the rotation operation of the steering wheel so as to generate first and second control pressures corresponding to the rotational quantity and rotational direction of the steering wheel on the basis of pressurized oil of a pilot hydraulic fluid source;
    first and second pressure sensors for detecting the first and second control pressures generated by the hydraulic steering unit respectively; and
    control means for controlling a stroke of the steering valve on the basis of the first and second control pressures which has been detected by the first and second pressure sensors respectively, and on the basis of the operational state of the front work device detected by said front operation detection means.

3. The steering system for the engineering vehicle according to claim 2,
    wherein the control means controls the stroke of the steering valve so that the stroke becomes larger with increase in the first and second control pressures which have been detected by the first and second pressure sensors respectively; and when the operation of the front work device is detected by said front operation detection means, the control means controls the stroke of the steering valve so that the stroke becomes larger than that provided when the operation of the front work device is not detected.

4. The steering system for the engineering vehicle according to claim 2,
    wherein the control means controls the stroke of the steering valve so that the stroke becomes larger with increase in the first and second control pressures which have been detected by the first and second pressure sensors respectively; and when the operation in which the movement of the front work device is relatively large is detected by said front operation detection means, the control means controls the stroke of the steering valve so that the stroke becomes larger than that provided when the operation in which the movement of the front work device is relatively large is not detected.

5. The steering system for the engineering vehicle according to claim 2,
    wherein the steering valve includes:
    a spool used as a valve; and
    first and second pressure receiving units which are disposed at both ends of the spool, the driving pressure being introduced into each of the first and second pressure receiving units so that the spool is driven on the basis of the driving pressure to change the stroke, and
    wherein the control means includes:
    first and second solenoid valves which are provided corresponding to the first and second pressure receiving units respectively, the first and second solenoid valves operating with a control current to output a driving pressure corresponding to the control current; and
    a controller which inputs detection values of the first and second pressure sensors and a detection value of said front operation detection means to perform specified arithmetic operation on the basis of the detection values, and then outputs the control current to the first and second solenoid valves.

6. The steering system for the engineering vehicle according to claim 5,
    wherein the controller includes:
    first calculation means for calculating a first target driving pressure which increases with increase in control pressure detected by the first pressure sensor;
    second calculation means for calculating a second target driving pressure which increases with increase in control pressure detected by the second pressure sensor; and
    third calculation means for modifying the first and second target driving pressures so that when the operation of the front work device is detected by said front operation detection means, values of the first and second target driving pressures become larger than those provided when the operation of the front work device is not detected, and
    wherein the controller outputs the control current to the first and second solenoid valves so that the first and second target driving pressures modified by the third calculation means are achieved.

7. The steering system for the engineering vehicle according to claim 1,
    wherein said steering system further comprising:
    a priority valve which is located between the hydraulic pump and the steering valve, and includes setting means for setting a target value of the differential pressure across the steering valve, the priority valve supplying by priority the steering cylinder with the pressurized oil discharged from the hydraulic pump and supplying an operational hydraulic circuit for driving a work device with a surplus flow of the pressurized oil, by controlling the differential pressure across the steering valve so that the differential pressure is kept at the target value, wherein said steering operation control means includes:

a hydraulic steering unit to which the steering wheel is coupled, the hydraulic steering unit operating by the rotational operation of the steering wheel so as to generate a control pressure corresponding to the rotational quantity and rotational direction of the steering wheel on the basis of pressurized oil of a pilot hydraulic fluid source;

a pilot hydraulic line for introducing the control pressure generated by the hydraulic steering unit into the pressure receiving unit of the steering valve to switch the steering valve; and control means for changing a target value of the differential pressure across the steering valve on the basis of the operational state of the front work device detected by said front operation detection means, the target value being set by the setting means of the priority valve.

8. The steering system for the engineering vehicle according to claim 7, wherein, when the operation of the front work device is detected by said front operation detection means, the control means changes the target value set by the settings means of the priority valve so that the target value becomes larger than that provided when the operation of the front work device is not detected.

9. The steering system for the engineering vehicle according to claim 7, wherein, when the operation in which the movement of the front work device is relatively large is detected by said front operation detection means, the control means changes the target value set by the settings means of the priority valve so that the target value becomes larger than that provided when the operation in which the movement of the front work device is relatively large is not detected.

10. The steering system for the engineering vehicle according to claim 7, wherein the control means includes:

a solenoid valve which operates with a control current, and outputs a control pressure corresponding to the control current;

a pressure receiving unit which is provided for the priority valve, the pressure receiving unit changing based on the control pressure the target value set by the setting means; and a controller which inputs a detection value of said front operation detection means to calculate a value corresponding to the operational state of the front work device on the basis of the detection value, and then outputs the control current to the solenoid valve so that the target value set by the settings means is changed to the calculated value.

* * * * *